(12) United States Patent
Alur et al.

(10) Patent No.: US 7,246,254 B2
(45) Date of Patent: Jul. 17, 2007

(54) SYSTEM AND METHOD FOR AUTOMATICALLY AND DYNAMICALLY OPTIMIZING APPLICATION DATA RESOURCES TO MEET BUSINESS OBJECTIVES

(75) Inventors: Nagraj Ramachandran Alur, San Jose, CA (US); Vitthal M. Gogate, Cupertino, CA (US); Inderpal Singh Narang, Saratoga, CA (US); Ramani Ranjan Routray, San Jose, CA (US); Mahadevan Subramanian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 10/621,857

(22) Filed: Jul. 16, 2003

(65) Prior Publication Data

US 2005/0015641 A1 Jan. 20, 2005

(51) Int. Cl.
*G06F 11/00* (2006.01)
(52) U.S. Cl. .................. 714/2; 714/6; 714/47; 700/173
(58) Field of Classification Search ............ 714/1, 714/2
See application file for complete search history.

(56) References Cited

U.S. PATENT DOCUMENTS

| | | | |
|---|---|---|---|
| 5,392,244 A * | 2/1995 | Jacobson et al. ........... 711/114 |
| 5,454,099 A * | 9/1995 | Myers et al. ............... 714/6 |
| 5,535,389 A | 7/1996 | Elder et al. ................ 395/700 |
| 5,890,133 A | 3/1999 | Ernst ........................ 705/7 |
| 6,266,784 B1 | 7/2001 | Hsiao et al. ............... 714/6 |
| 6,366,930 B1 | 4/2002 | Parker et al. .............. 707/203 |
| 6,487,562 B1 * | 11/2002 | Mason et al. .............. 707/205 |
| 6,571,314 B1 * | 5/2003 | Komachiya et al. ........ 711/114 |
| 6,877,066 B2 * | 4/2005 | Benfield et al. ............ 711/118 |
| 6,907,546 B1 * | 6/2005 | Haswell et al. ............. 714/38 |

(Continued)

FOREIGN PATENT DOCUMENTS

JP 6326813 11/1994

OTHER PUBLICATIONS

Roger Haskin et al., "Recovery Management in QuickSilver," ACM Transactions on Computer Systems, vol. 6, No. 1, Feb. 1988, pp. 82-108.

(Continued)

*Primary Examiner*—Robert Beausoliel
*Assistant Examiner*—Emerson Puente
(74) *Attorney, Agent, or Firm*—Samuel A. Kassatly

(57) ABSTRACT

A system and method to automatically and dynamically optimize available resources to meet application data availability and business objectives. In one embodiment, a backup and data recovery system continually and dynamically adjust to the backup and recovery or restore process depending on the customer's environment, workload, and business objectives. Acceptable tolerance of downtime due to recovery and backup impacts the customer's business or system operation. From this high-level business requirement, the present system determines the backup and recovery plan details. The present system accepts application data availability policies based on business objectives, and devises, executes and refines a resource optimal backup and recovery strategy required to deliver the desired quality of service in the environments that have dynamically changing application workloads, business objectives, and hardware/software infrastructure technologies. In addition, the present system performs backups outside blocked windows to minimize the impact on the customer's system.

31 Claims, 5 Drawing Sheets

U.S. PATENT DOCUMENTS

| | | | |
|---|---|---|---|
| 6,950,871 B1* | 9/2005 | Honma et al. | 709/226 |
| 2002/0065999 A1* | 5/2002 | Kikuchi et al. | 711/162 |
| 2002/0091989 A1 | 7/2002 | Cole et al. | 717/102 |
| 2002/0188430 A1 | 12/2002 | Benny et al. | 703/7 |
| 2002/0188485 A1 | 12/2002 | Benny et al. | 705/7 |
| 2002/0188739 A1 | 12/2002 | Benny et al. | 709/230 |
| 2002/0194096 A1 | 12/2002 | Falcone et al. | 705/35 |
| 2002/0194535 A1* | 12/2002 | Largman et al. | 714/13 |
| 2003/0035548 A1 | 2/2003 | Kwan | 380/286 |
| 2006/0117221 A1* | 6/2006 | Fisher et al. | 714/21 |

OTHER PUBLICATIONS

Chan et al., "The Implementation of An Integrated Concurrency Control and Recovery Scheme," ACM, 1982.

Miyanishi, Y. et al., "Replicated Data Management in Distributed Computer Supported Cooperative Work," Concurrent Engineering: Research and Applications, vol. 6, issue 4, Dec. 1998, pp. 301-308.

Workman, K.M. et al., "Designing an Optimized Enterprise Windows NT/95/98 Client Backup Solution with Intelligent Data Management," Large Installation Systems Administration of Windows NT Conference, Seattle, Aug. 5-8, 1998, pp. 69-73, Proceedings.

"International Conference on Management of Data," SIGMOD Record, vol. 29, issue 2, Jun. 2000: ACM SIGMOD, Dallas, May 16-18, 2000, Proceedings.

P. Cartese, "Improving Business Continuity Through Distributed Data Management," DM Review, vol. 12, issue 5, May 2002, pp. 52-54.

Sullivan N, et al., "Index Implementation Supporting Fast Recovery for the POSTGRES Storage system," International Conference on Data Engineering, 8th, Tempe, AZ, Feb. 2-3, 1992, pp. 293-300.

M.D. Nasta et al., "Generalized Model of Restart and Recovery Problem in Data Base Management System," Bulletin of Operations Research Society of America, vol. 23, Issue: Suppl. 1, ORSA / TIMS National Meeting, Chicago, Apr. 30-May 2, 1975, Program, Spring 1975, pp. B/111-112.

\* cited by examiner

SYSTEM AND METHOD FOR AUTOMATICALLY AND DYNAMICALLY OPTIMIZING APPLICATION DATA RESOURCES TO MEET BUSINESS OBJECTIVES

FIELD OF THE INVENTION

The present invention generally relates to data storage on computer systems, and more particularly to systems for backing up and recovering physically or logically damaged resources on that data storage. Specifically, this invention relates to a backup and data recovery system that continually and dynamically adjusts the backup and recovery process depending on the environment and workload, to meet application data availability that is defined in terms of business objectives.

BACKGROUND OF THE INVENTION

A database administrator's (DBAs) task is to administer and manage the health of the database environment that runs the business critical applications of the enterprise. This comprises ensuring the continued availability of database objects comprising the applications, and ensuring that the databases are well tuned to deliver the required performance expected of the business applications. For example, a database administrator is responsible for data backup in order to perform data recovery in the case of a system failure. Customers define the maximum time they can tolerate before the system is restored after a system failure. In many cases, the amount of time to recovery depends upon the technology used and the frequency of data backup.

From an application data availability perspective, the DBAs challenge is to deliver the required quality of service (QoS) for application data availability as demanded by the business application in the face of changes in the number of database objects, the size of the objects, and the volatility of the objects. In addition, DBAs should maintain the required QoS while dealing with changes to the hardware/software configurations, changes in the application workload, and potential changes to the QoS of the business application itself. Specifically, for each application's database and file objects, the DBA needs to use optimal technologies to perform the backup and recovery, determine the optimal backup frequency to conserve computing resources, and use the optimal backup and recovery strategy to deliver the required QoS.

Application data recovery is therefore a very skill-intensive requirement, resulting in increased total cost of ownership for an enterprise. This increased cost is due to several factors including non-optimal use of system resources. For example, DBAs tend to implement overcompensated strategies to avoid devising complex optimal backup schedules. Application data recovery can require manual monitoring and rescheduling of events as changes occur in the application objects, application workload, hardware, and software infrastructure. These complexities lead to many human errors in executing backup/recovery strategies that compromise the integrity of application data and fail to deliver the desired QoS.

A DBA typically determines the frequency of backup for the system based on worst case scenarios and the business' requirement for tolerable or acceptable downtime during recovery. Database data is not lost in the case of a failure; all updates to the database data are written to a log. To restore the system to a point of failure, the data is restored from the last backup and the restoration process rolls forward changes recorded in the logs since the last backup up to the point of failure.

Through this process, the database reads and applies all the incremental changes in the logs and the data is restored to the point of failure. If the backup is performed every seven days, the DBA most likely assumes that the worst case scenario point of failure occurs on the seventh day, before backup occurs. In this situation, the recovery time is the longest.

To meet a contracted quality of service (QoS) based on the customer's tolerance for downtime during recovery, the DBA may guarantee that the outage during which restoration occurs is less than the downtime allowed by the customer. Consequently, the time to restore the data from the last backup and roll forward incremental changes from the log should be less than the downtime allowed by the customer.

To determine an optimum backup approach and schedule, the DBA should analyze many aspects of the database and its environment, comprising the amount of data that may need to be restored, the machine on which the database operates, the operating system, the database type and version, etc. Given the amount of data, the DBA should determine if it is even possible to restore data in a worst case scenario and meet the QoS guarantees. Overall, the DBA should have a clear understanding of the operating environment, hardware, software, and capabilities. While this approach may yield an optimum backup approach and schedule, it is labor intensive and applies only to the initial state. All of these factors may change over time, necessitating a continuous refinement in the optimum backup approach and schedule.

Currently, a DBA determines the backup schedule manually. The DBA determines the amount of data to be backed up and how long the restore process may take. The DBA may, for example, determine that a backup may comprise 100 GB of data and the database is IBM DB2 with parallel recovery.

The DBA determines that restore from backup may take, for example, 5 minutes. The DBA then calculates the time required for roll forward. If the backup is performed every Monday, then the worst case scenario is if the point of failure is on the next Sunday. The more changes that have been made to the application's data, the longer it tends to take to restore the application's data. It may be, in this example, that it may take 15 minutes to perform roll forward. The total time required to restore the application would then be 20 minutes: 5 minutes for restore from backup and 15 minutes to perform roll forward. The customer may have contracted for a QoS guarantee of 10 minutes for a downtime limit. To ensure that QoS guarantees are met, the easiest option for the DBA would be to increase the frequency of backups, perhaps as often as daily. While this would ensure that the QoS guarantee is met, this is most likely not the most efficient use of resources.

A number of database and third party software vendors provide backup and recovery solutions at the database level, and some claim to offer data recovery at the application level as well. Almost all the vendors have backup and recovery offerings, provide assistance in generating the jobs with the relevant object names and syntax required to execute the backup and recovery functions and management tools that track the backups generated.

Complicating the issue of data recovery is the specification of application data availability. Business applications depend on data. Application data availability is key for continuous operations of the business. There needs to be a specification of application data availability at the application level, i.e., for all types of data involved in a business application. Furthermore, the specification should be in terms of business semantics at an application level (i.e., having a higher level of abstraction) rather than at the traditional individual data object level (which does not factor the impact on overall application availability particularly when the application comprises multiple data objects.)

The challenge is to define a set of business level metrics for applications availability that is then translated into domain specific business metrics. These business level metrics eventually drive the underlying allowable hardware and software information technology (IT) infrastructure to deliver the required business level objectives. Examples of domains other than availability comprise performance.

Specifically, from an availability domain perspective, an application's data (both databases & files) in turn should meet certain business objectives of availability and recovery of the application. Once such business-semantic specifications are defined, an enterprise or a service provider (xSP) has a consistent method of specifying its requirements for availability to deliver the required QoS, independent of a specific underlying infrastructure.

The conventional approach for application availability is missing a holistic view of all data stores (databases and files) of an application for data recovery that may span multiple eclectic systems. In addition, the ability to specify application data recovery requirements in a declarative fashion using business objectives/semantics does not currently exist. Furthermore, there currently is no mechanism for a systematic approach to map business objectives into an allowable set of technologies.

For an optimum backup approach and schedule, the QoS should be viewed as comprising the following parts:

Time to detection,
Time to decision, and
Execution of process.

The conventional approach only addresses the time required to execute the restoration process. What is needed is a system that may, within the QoS limit, detect the failure and determine an optimum restoration plan in addition to executing the restoration process.

The conventional approach for data recovery systems lacks a mechanism to translate business objectives for application data availability into an optimal backup and recovery strategy that is devised and executed to meet the desired QoS. In addition, these data recovery systems lack a mechanism for determining the optimal technologies to use for backup and recovery tasks. No mechanism is currently available to develop optimal schedules for backup. Further, no mechanism exists to determine optimal recovery strategies.

Furthermore, the conventional approach for data recovery systems lack a mechanism to adapt and refine all of the above in environments that have dynamically changing application workloads, business objectives, and hardware/software infrastructure technologies. Thus, there is a need for a data recovery system and method that automatically and dynamically optimize backup resources. The need for such system and method has heretofore remained unsatisfied.

SUMMARY OF THE INVENTION

The present invention satisfies this need, and presents a system, a computer program product, and an associated method (collectively referred to herein as "the system" or "the present system") for a backup and data recovery system that continually and dynamically adjusts itself depending on the environment and workload, to meet the customer's business objectives. Tolerance of downtime due to recovery and backup impacts the customer's business or system operation. From this high-level business requirement, the present system determines the backup and recovery plan details.

The present system accepts application data availability policies based on business objectives, and devises, executes and refines a resource optimal backup and recovery strategy required to deliver the desired quality of service (QoS) in the environments that have dynamically changing application workloads, business objectives, and hardware/software infrastructure technologies. In addition, the present system performs backups outside customer specified windows (also referred to herein as blocked windows) to minimize the impact on the customer's system. The present system also avoids redundant backups.

The present system utilizes a declarative specification for Application Data Recovery requirements in terms of business objectives. Business objectives are defined in terms of application dimensions. One or more qualitative Quality of Service metrics (also referred to as Service Offering Elements or SOEs) is associated with each of these application dimensions. As used herein, a Service Offering Package (SOP) is a qualitative QoS metric that represents the collection of one and only one instance of each individual SOE.

The present system provides application data recovery requirements defined in a manner that implicitly comprises all data objects associated with an application, regardless of their data stores, and the systems on which they reside. These application data recovery requirements are specified in terms of business objectives. Application data recovery is associated with a qualitative metric defined in terms of application data recovery dimensions that represent business semantics. This qualitative metric can be used by a customer as a vehicle to continually devise and drive an execution policy that meets the application data recovery QoS through the exploitation of allowable underlying IT infrastructure technologies.

The present system facilitates optimization of the technologies allowable to deliver the desired QoS. This is similar to the abstraction provided by the SQL language in relational DBMS that does not comprise access path constructs, thus facilitating query optimization.

The present system allows changes in the underlying IT technologies associated with an SOP to be transparently exploited by the SOP implementation customer to ensure that the application data recovery SOP QoS requirements continue to be met. These changes in underlying IT technologies may result in the desired QoS not being achievable. The present system then alerts the customer, suggesting an upgrade to a higher QoS. The present system may also be able to identify the hardware and software prerequisites to deliver the higher QoS level if the higher QoS cannot be achieved with the existing infrastructure.

The present system accomplishes this by reevaluating the application workload using features and technologies that are allowed for use with the higher QoSs and proprietary performance models by hardware/software platforms. The present system then identifies those features and technologies that can deliver the required QoS but are currently missing in the existing infrastructure.

The present system can specify the applications that use the backup and recovery resources. For example, a customer may have a retail application comprising an inventory management system, a sales and distribution system, and an accounting system. The present system could allocate the backup and recovery systems at a higher level of abstraction as specified by the customer to individual systems. In this case, the most important system gets the highest level of service, and is recovered more quickly. The present system is able to allocate resources dynamically among the customer's many applications, systems, or departments.

The present system provides flexibility for the customer to change the QoS specification depending upon evolving business requirements and priorities, without having to specify the technological implementations needed to address the new business objectives. For example, changing the association of an application to an SOP (either an upgrade or a downgrade corresponding to a change in business objectives) can be transparently managed by the present system to deliver the new QoS requirements.

In the event the new QoS requirements can not be met with the allowable technologies, the present system has the potential to generate an alert about the inability to deliver the required QoS with the given IT infrastructure and/or SOE capabilities. The hardware and software prerequisites to deliver the higher QoS (in case of an upgrade) can be identified if the higher QoS cannot be achieved with the existing infrastructure.

By defining a standard specification of application data recovery business-metrics, the present system provides automatic mapping between business-level metrics and the underlying IT infrastructure technologies required to deliver the required QoS. This separation allows either the QoS specification or the underlying IT technologies to be changed independently of the other. The present system devises, executes, and refines an execution policy to ensure that the desired QoS is delivered.

The present system leverages its SOP/SOE specification capabilities to determine the optimal technologies to use for a given task. These optimal technologies are derived from the allowable technologies, constrained by the application environment. The present system also uses statistics from actual performance, benchmarks and estimates, in addition to the application's workload and data volatility, to determine the optimal backup and recovery strategy.

The present system generates intelligent and optimal schedules to deliver the desired QoS, based on the optimal technologies derived. In addition, the present system operates within scheduling constraints and resource utilization limits, and analyzes the results of actual executions. The present system determines the optimal backup and recovery strategy to deliver the desired QoS. Backup and recovery execution strategies are continually refined based on changes in the environments that have dynamically changing application data objects, application workloads, business objectives, and hardware/software infrastructure technologies.

The present system is generally analogous to a query optimizer in a Relational Database Management System (RDBMS) that chooses an optimal execution strategy based on access paths and statistics for the objects being queried. The present system chooses the optimal backup/recovery technology from the allowable selection of technologies.

A query optimizer in an RDBMS reoptimizes, automatically or on demand, the access path of a query. When the reoptimization is triggered, it automatically takes into account changes in the object sizes and available access paths that affect the query. The present system reoptimizes the backup and recovery execution strategy to accommodate changes in the number of database objects, the size of the objects, the volatility of the objects, changes to the hardware/software configurations, changes in the application workload, and potential changes to the QoS of the business application.

The present system devises and executes an optimal backup and recovery strategy to meet the QoS of Applications Data Availability. In addition, the present system determines the optimal hardware and software technologies relevant for the backup and recovery tasks. The present system selects the optimal technologies that are available from the set of allowable technologies, in conjunction with performance metrics gathered from actual executions, benchmarks, and analytic models, to meet the business objectives. Allowable technologies may be constrained by systemwide restrictions, SOPs, and applications.

The present system provides heterogeneous product support, including backup/recovery tools from numerous customers.

The present system determines an optimal Recovery execution strategy. Factors considered in determining the optimal recovery strategy comprise:

the relative importance of the damaged data object, the extent of damage to the data object, the technologies previously used to take the backups, and the DBAs constraint of whether to automatically schedule the recovery task.

The present system adapts and refines the foregoing factors through runtime event feedback, heuristics and data mining. To automatically adapt and refine the backup and recover execution strategies, the present system monitors changes in the system environment (both hardware and software), application workload, number and size of database objects, data volatility at object level, business objectives and exception events (such as task failures and database object failures).

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standard protocols to form a global, distributed network.

Parallel technologies: Using more than one computer at the same time for backup or recovery, or using more than one processor working simultaneously within the same computer.

World Wide Web (WWW, also Web): An Internet customer—server hypertext distributed information retrieval system.

Figure 1:
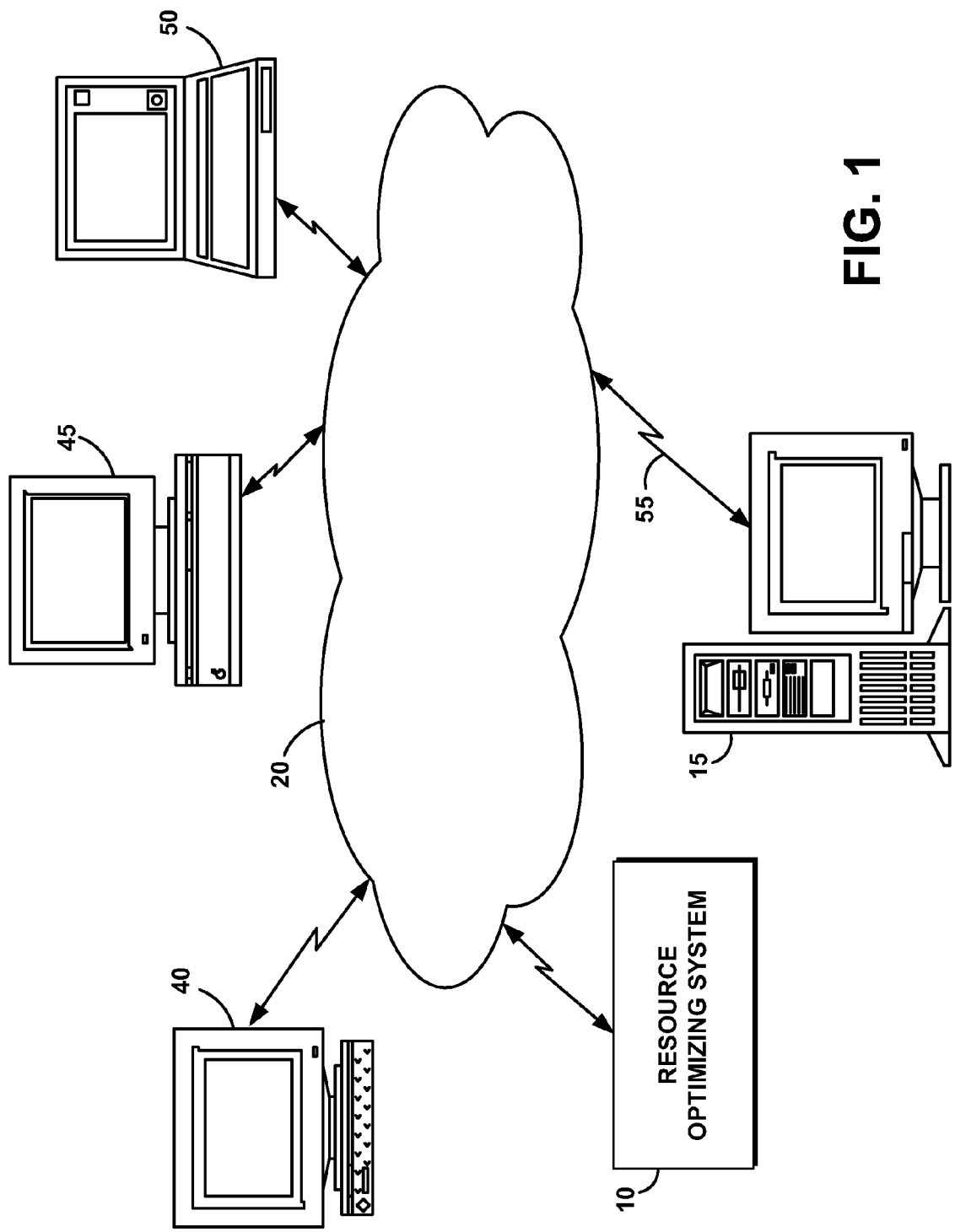
FIG. 1 is a schematic illustration of an exemplary operating environment in which a resource optimizing system of the present invention can be used.

FIG. 1 portrays an exemplary overall environment in which a system and associated method for automatically and dynamically optimizing resources according to the present invention may be used. The resource optimizing system 10 comprises a software programming code or computer program product that is typically embedded within, or installed, at least in part, on a host server 15 provided by the customer. Alternatively, system 10 can be saved on a suitable storage medium such as a diskette, a CD, a hard drive, or like devices. While the system 10 will be described in connection with the WWW, the system 10 can be used with a standalone system such as database, storage system, etc. of terms that may have been derived from the WWW and/or other sources.

The cloud-like network 20 is comprised of communication lines and switches. The network 20 provides the communication access to, for example, the WWW or Internet. Customers' computers are represented by a variety of computers such as computers 40, 45, 50. The resource optimization of the computers 40, 45, and 50 are controlled by system 10, by means of direct connections, or as shown in FIG. 1, via the network 20.

In one embodiment, system 10 is embedded on a host server 15. The host server 15 can be connected to the network 20 via a communications link 55 such as a telephone, cable, satellite link, or like connections.

System 10 utilizes a declarative specification for Application Data Recovery requirements in terms of business objectives, alternately referenced as application dimensions. One or more qualitative Quality of Service (QoS) metrics is associated with each of these application dimensions. This QoS metric is referred to as Service Offering Element (SOE). A systematic approach is provided to map the qualitative QoS associated with each application dimension to a set of technologies of the configured hardware and software products, such as DBMS, storage controller, to meet the business objectives. A qualitative QoS is also defined for the collection of each instance of an SOE. This collection is called the service offering package (SOP).

System 10 identifies a set of key business-level elements relevant to application data recovery; these elements are called application data recovery dimensions. Examples of dimensions comprise recovery time (to the point of failure), performance impact, retention period (for the backups), and logical data recovery time (also-known-as point-in-time recovery time). Application data recovery applies to both a remote disaster recovery site as well as recovery at the local site. At the present stage, the disaster recovery considerations have not been completely defined, as additional application dimensions will probably need to be defined to support the disaster recovery capability. Application data recovery dimensions can be extensible.

System 10 allows each dimension to have one or more associated qualitative metrics associated. Each qualitative metric is mapped to one or more underlying technologies in the underlying IT infrastructure that can be used to deliver the requirements of the application data recovery dimension. Each such qualitative metric is called a service offering element (SOE). Examples of SOEs for the Recovery Time dimension could comprise "NORMAL" SOE, "FAST" SOE, and "ULTRAFAST" SOE. The "NORMAL" SOE might use only database sequential backup, sequential restore, and sequential roll forward technologies. The "FAST" SOE might use database sequential and parallel technologies. The "ULTRAFAST" SOE might use database sequential technologies, parallel technologies, and storage subsystem "snapshot"/"flash copy" technologies. Any number of such qualitative metrics may be defined for a given dimension.

The underlying features and technologies identified by system 10 as being associated with SOEs apply to both hardware and software belonging to more than one customers, i.e., 15. The capability of supporting an eclectic mix of technologies from multiple customers 15 enables system 10 to implement QoS delivery that is hardware and software neutral.

Figure 2:
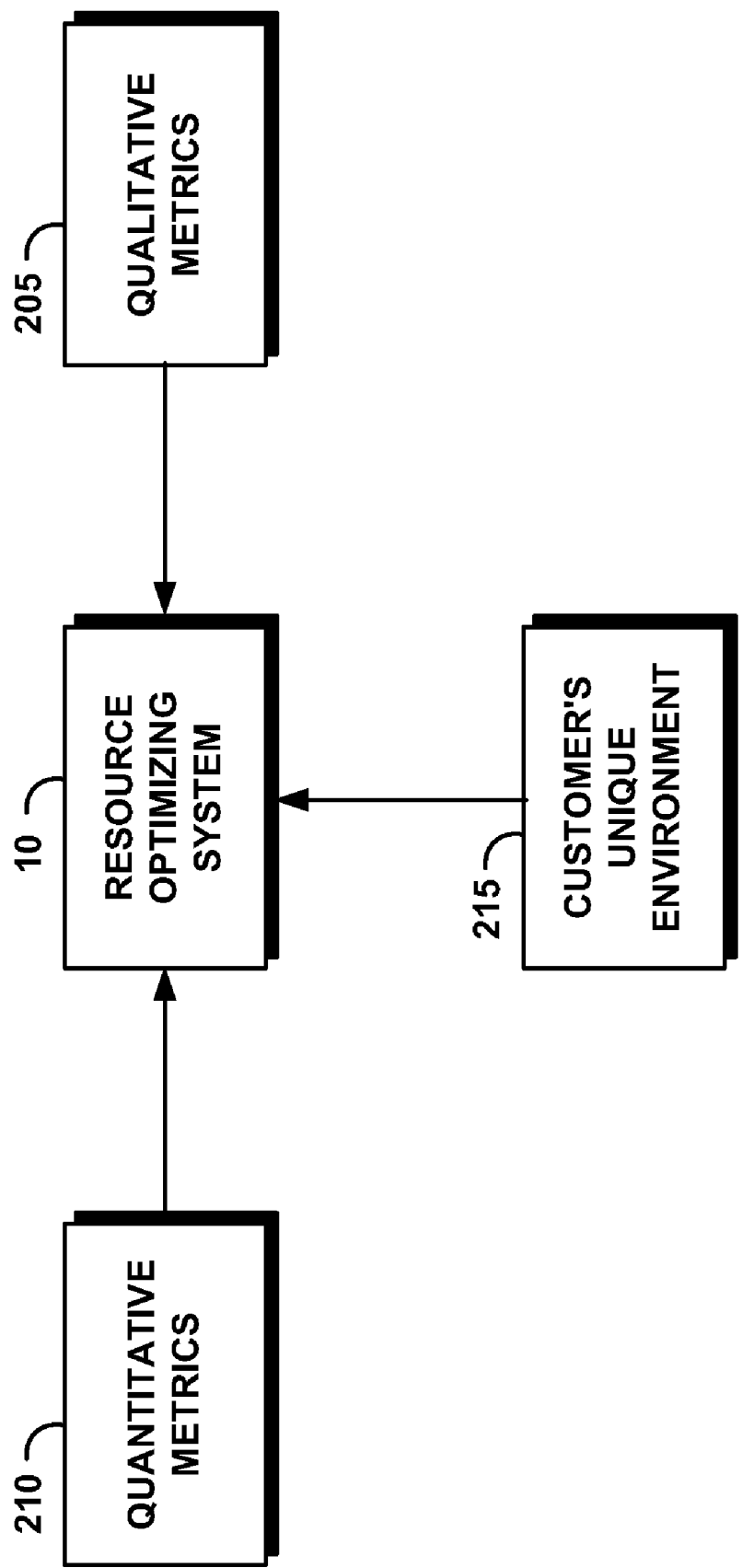
FIG. 2 is a block diagram of the high-level architecture of the resource optimizing system of FIG. 1.

System 10 defines one or more SOPs, where each SOP represents a particular qualitative service metric. FIG. 2 illustrates the elements used by system 10 to develop a backup approach; the qualitative metrics 205, the quantitative metrics 210, and the customer's unique environment 215. Qualitative metrics 205 comprise SOEs; each SOE translates a backup feature or technology to a backup level of capability such as normal, fast, etc. The customer's unique environment 215 comprises the application being backed up, workloads, machines used by the customer, operating systems, etc. Quantitative metrics 210 provide the values that drive the strategy.

Figure 3:
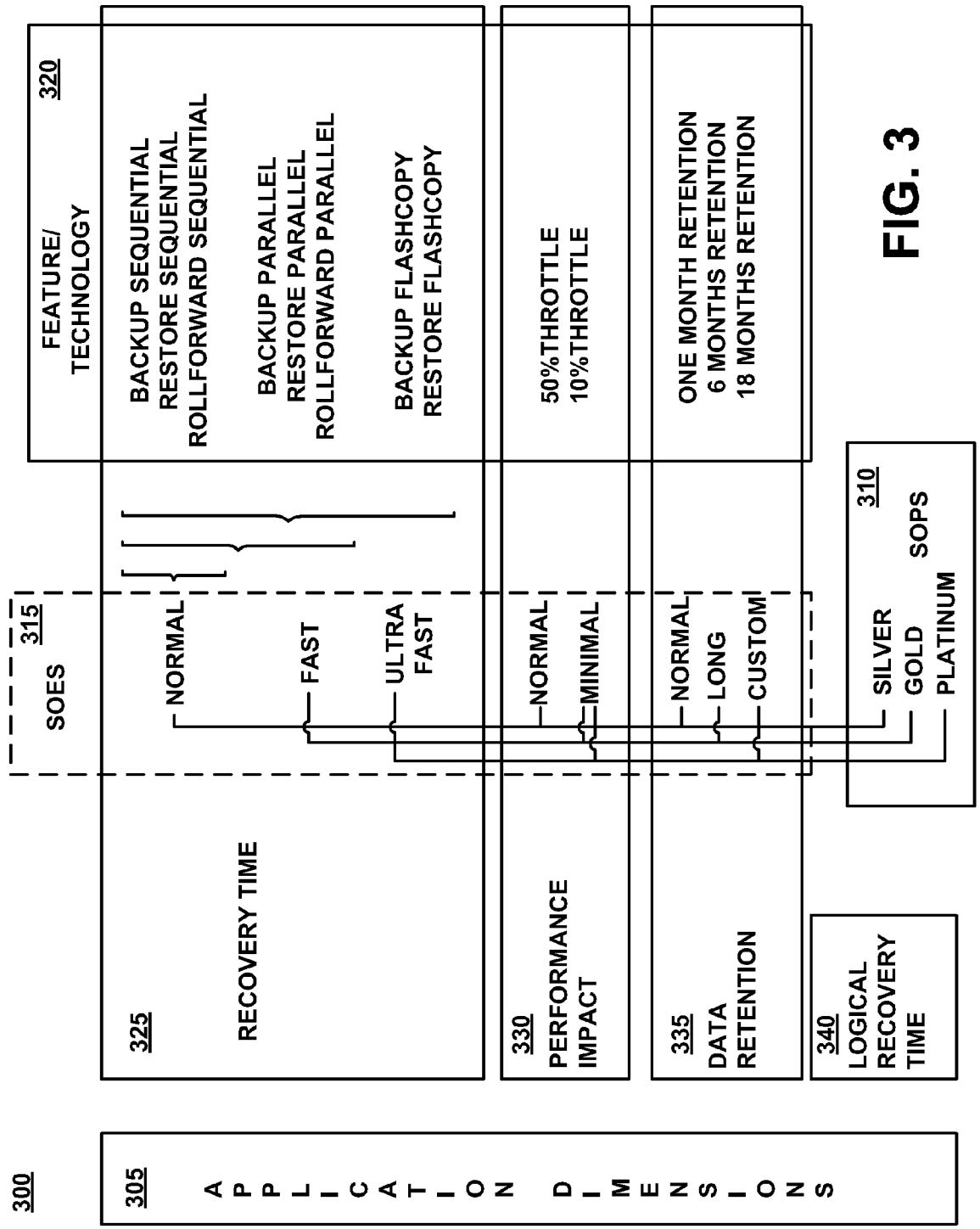
FIG. 3 is a schematic illustration portraying the operation of the resource optimizing system of FIGS. 1 and 2.

Exemplary SOPs might comprise a PLATINUM SOP, GOLD SOP, SILVER SOP, etc. FIG. 3 illustrates the hierarchical relationships within business level availability domain 300, comprising application data recovery dimensions 305, SOPs 310, SOEs 315, and underlying features/technologies 320. In FIG. 3, and an exemplary set of features/technologies 320 translated to an exemplary set of SOEs 315.

System 10 allows the customer, e.g., server 15 to define custom SOEs 315 with the customer's unique environment 215. Default SOEs 315 are provided by system 10 that may also be customized by the customer 15 to suit their particular offering. Default SOPs 310 are provided that may also be customized by the customer 15 to suit their particular offering. System 10 also allows the customer 15 to define custom SOPs 310, each with its own unique mapping to SOEs 315. Customers 15 are also able to modify the default SOPs 310 and SOEs 315 provided.

The customer is not required to understand the various nuances of the backup technologies. Rather, the customer is presented with several levels of SOPs 310 and the implications of each of those SOPs 310 on the recovery response, and performance impact and cost. In contrast, most backup services currently allowable offer only one type of backup with no consideration for the customer's needs.

An exemplary set of application dimensions 305 in FIG. 3 comprises recovery time 325, performance impact 330, data retention 335, and logical recovery time 340. For each of these dimensions, there exists certain technology or quantitative metrics 320 allowable to meet the QoS for which the customer has contracted. System 10 uses the most efficient allowable technology 320 to meet the QoS within the specific application dimension 305. Consequently, system 10 is not locked into any one specific backup and recovery technology 320.

Recovery time 325 refers to the time required to recover data to the point of failure. For exemplary purposes, recovery time 325 may be defined in terms of normal, fast, and ultrafast. More levels for recovery time 325 are possible, if desired by the customer 15. Possible technologies allowable for use by system 10 are backup sequential, restore sequential, roll forward sequential, backup parallel, restore parallel, roll forward parallel, backup flash copy, and restore flash copy. This set of technologies is exemplary, and may change as new technologies are adapted or removed by the customer 15.

In this example, a normal recovery time 325 makes use of backup sequential, restore sequential, and roll forward sequential. A fast recovery time 325 might use backup parallel, restore parallel, and roll forward parallel in addition to the technologies used to achieve normal recovery time 325. An ultrafast recovery time 325 might use backup flash copy and restore flash copy in addition to the technologies used to achieve fast recovery time 325.

Data retention 335 is the application dimension 305 that refers to how long data backups may be retained. In the example of FIG. 3, the customer has the option of normal SOE 315 providing one month of data retention 335, long SOE 315 providing 6 months of retention, or a custom value SOE 315. In this example, the customer has chosen 18 months for the data retention 335.

Logical recovery time 340 is the amount of time required to restore the state of the application's data to the desired point in time.

An application would be associated with a particular qualitative metric 205 (i.e. SOP 310) that can subsequently be modified by the customer to either upgrade or downgrade an existing QoS level. An application data recovery requirement is typically mapped to a qualitative SOP 310. The application data recovery requirement should also be mapped to a quantitative metric for each of the application dimensions 305 (for example, 15 minutes for the dimension of Recovery time 325) to help the customer understand all the aspects of the qualitative QoS level being promised.

The quantitative metric for a given qualitative metric depends upon the hardware and software platform on which this application runs. System 10 provides a model to map from a qualitative metric to a quantitative metric, and vice versa. In cases where the required quantitative metric value is known and the corresponding qualitative metric has to be ascertained the model maps from a quantitative metric to a qualitative metric. The application is associated with a qualitative metric and not a quantitative metric. Initially, this model starts with estimates and benchmarks and subsequently refines itself with the actual measurements in various configured environments.

Recovery time 325 is measured in minutes or seconds, the data retention 335 is measured in months, the performance impact 330 is measured in percentages, etc. For example, the backup task should not consume more than 10% of the non-idle resources in the system in which it executes. The recovery time 325 comprises the following components: time to detect the need for a recovery, the time required to decide when the recovery ought to occur and the delay thereof, and the time to actually recover the damaged assets. The time to recover the damaged assets is the QoS promised in most cases.

System 10 accepts qualitative and quantitative business level metrics for the availability of an application's data. From these metrics, system 10 devises, executes and refines a backup and recovery strategy to deliver the desired QoS. System 10 uses optimal technologies and optimal schedules in the light of changing business objectives, application workloads and system environment to deliver the desired QoS. The business objectives map to a set of technologies of configured hardware and software products (such as DBMS, storage controller, etc.) to provide gradations of service.

To perform the backup and/or recovery task, system 10 chooses the optimal technologies from a set of allowable technologies (defined by the SOP 310). These technologies are selected in conjunction with performance metrics (including application workload, data volatility) gathered from actual executions, benchmarks, and analytic models.

For example, a customer may wish to select a platinum level SOP 310. In the case of FIG. 3, a platinum level SOP 310 allows system 10 to use any backup, restore, or roll forward technology 320 allowable. Performance impact 330 is minimal, with 10% throttle (that is the percentage of non-idle resources that can be consumed). Data retention 335 is customizable; in this case, the customer selects 18 months.

The customer requests a level of service which system 10 converts that level of service into application dimensions 305 and quantitative performance specifics such as guaranteed recovery time 325, performance impact 330, data retention 335, and logical recovery time 340. Conversely, system 10 can also translate quantitative performance specifics into qualitative metrics such as SOP 310. For example, the customer isn't concerned with whether the SOP 310 is silver, gold or platinum, but does care that their system downtime is less than 10 minutes and the cost to achieve that QoS.

Using the technologies chosen, system 10 devises an optimal backup schedule required to meet the desired QoS of application data availability within the application level constraints imposed by the customer. These constraints comprise allowable products/features, backup schedule constraints (blocked windows of operation, and before or after a task is run), and allowable consumption of available resources during execution. System 10 executes the schedule devised above to deliver the desired QoS and refines the original execution strategy to ensure that QoS requirements are continuously being met.

Figure 4:
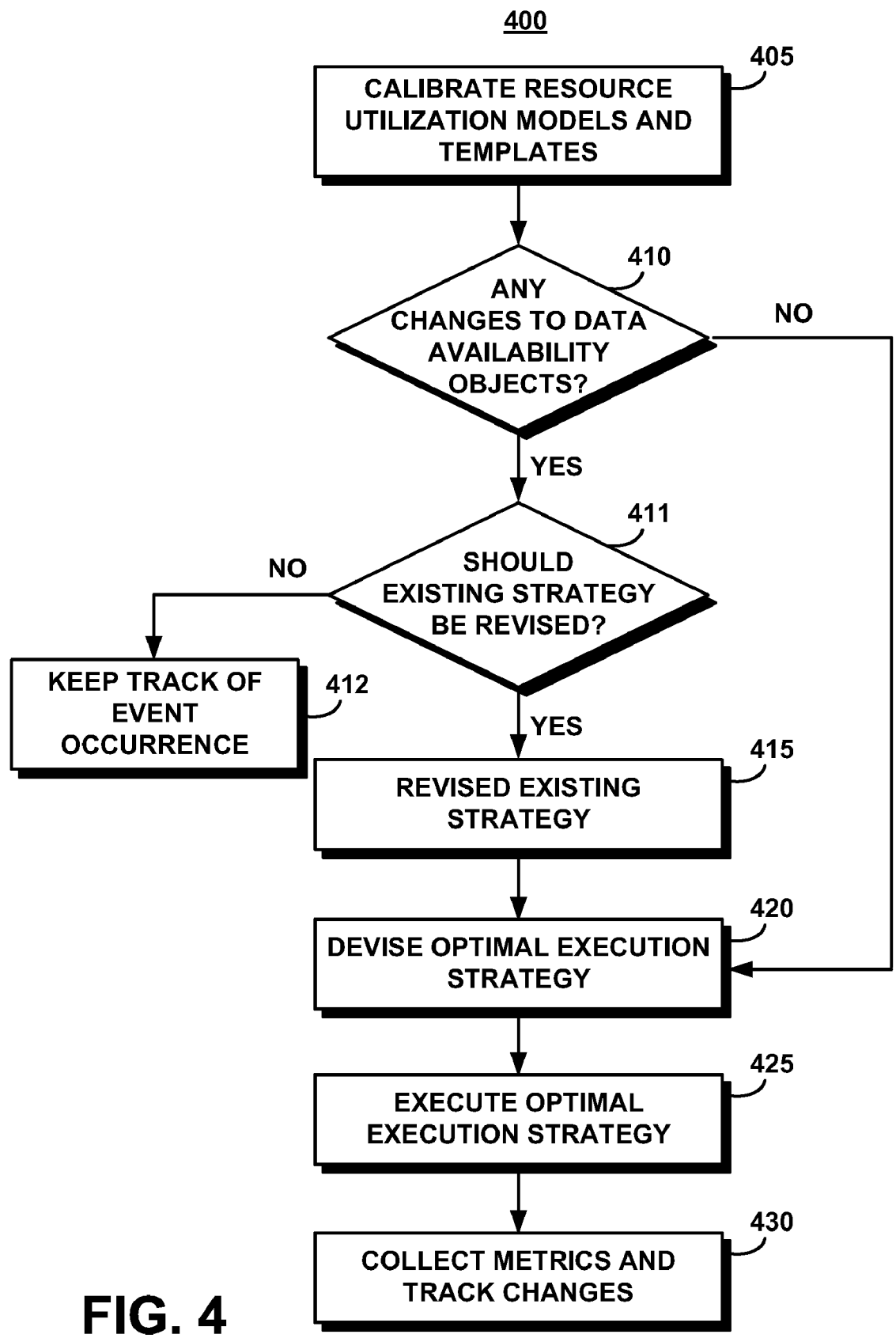
FIG. 4 is a process flow chart illustrating a method of operation of the resource optimizing system of FIGS. 1 and 2.

A method 400 of operation of system 10 is illustrated by the process flowchart of FIG. 4. System 10 initially calibrates the resource utilization models and templates at block 405. System 10 monitors changes in the business objectives, the application's workload, and the system environment such as hardware and software, adapting as needed to seasonal variations in the workload as well as to changes in the system configuration by refining the strategy, to deliver a guaranteed QoS.

At decision block 410, system 10 determines whether any changes occurred in the business objectives, application's workload, or system environment. If any changes have occurred, and if required (decision block 411), system 10 revises the existing backup strategy at block 415. System 10 uses changes in application workload and object, exception events, changes in hardware and software configuration, QoS conformance metrics, changes to application data availability objectives, and resource utilization models and templates to revise the existing strategy. Over time, the algorithms automatically use measured numbers of previous runs in the application environment to arrive at a more accurate backup schedule, optimizing consumption of the system's resources. If at decision block 411 method 400 determines that the existing strategy should not be revised event though changes has occurred (decision block 410), then system 10 keeps track of the event occurrence, i.e., that changes have taken place and that the existing strategy has not been revised in response to these changes.

System 10 devises an optimal execution strategy at block 420. Any changes have been made to the application data availability objects at block 410 are comprised in the revised strategy. Factors considered in determining the optimal recovery strategy comprise:

the extent of damage to the data objects, and
the technologies previously used to take the backups.

The present system adapts and refines of all of the above factors through runtime event feedback, heuristics and data mining. To automatically adapt and refine the backup and recover execution strategies, the present system monitors changes in the system environment (both hardware and software), application workload, number and size of database objects, data volatility at object level, business objectives and exception events (such as task failures and database object failures).

At block 425, system 10 executes the optimal strategy.

System 10 collects metrics and tracks changes at block 430 to use in revising the backup and recovery strategy. These metrics comprise runtime collection of execution metrics, capture of exception events, and automatic discovery of changes in the application workload and application events. In addition, system 10 monitors the system's hardware and software configuration for changes. Operation of method 400 then returns to block 405, and blocks 405 through 430 are repeated.

System 10 continually monitors the application's objects for actual or impending failure and responds with a recovery strategy to deliver the desired QoS. The decision points comprise whether to schedule the recovery automatically based on DBA constraints, the relative importance of the damaged object(s), and the extent of damage to the data object(s). In addition, system 10 determines which of the available backup images to use for the recovery task, for example, whether to use a storage system flash copy image or a database system backup image for the recovery task.

For example, an application called Inventory Mgmt is registered as Gold SOP 310. The application environment comprises the following:

Operating system: AIX
Database: DB2 Version 8
Data resides on: DAS (Directly Attached Storage)
Archive server: TSM
Total application data size: 25 GB
Percentage of daily updates: 1% of the total application data. For this example, a model is available that translates the Gold SOP 310 into quantitative metrics for its individual SOEs 315 based on the infrastructure involved, the number and size of the application's data objects, and the volatility of the data objects, to name a few of the considerations involved. This model selects fast recovery time 325, minimal performance impact 330, and long data retention 335. An exemplary expression of these qualitative selections in quantitative terms is:

RECOVERY_TIME_FAST->
Allowable technologies are:
AIX_DB2_v8_backup_parallel,
AIX_DB2_v8_recovery_parallel,
AIX_DB2_v8_backup_incremental,
AIX_DB2_v8_recovery_parallel,
TSM_Backup_Compress,
IBM_ESS_FLASHCOPY
Quantitative number is 15 minutes
PERFORMANCE_IMPACT_MINIMAL->
Allowable technology 320 is:
AIX_DB2_v8_throttle
Quantitative number: 20% impact on non-idle resources
DATA_RETENTION_LONG->
Allowable technology 320 is:
TSM_Archive_Compress
Quantitative number: 6 Months Based on technologies 320 that are allowable through Gold SOP 310, performance metrics such as actual measurements, benchmarks, and estimates, application workload and data volatility, system 10 finds that for the backup event, the optimal technologies to use are AIX_DB2_v8_backup_parallel and TSM_Backup_Compress. Based on the optimal technologies derived, scheduling constraints, resource utilization limits, system 10 finds that to meet the QoS, backups should be scheduled every 2 days.

Sometime later, this exemplary application environment of changes. Data moves from DAS to IBM ESS and total application data size doubles to 50 GB. The discovery of this significant change in application data size is analyzed by the analytic and mining engine (FIG. 5) and determined to be an actual or an imminent threat to the ability to deliver the desired QoS. An automatic refinement process is triggered to explore new execution strategies to deliver the desired QoS.

The refinement process of system 10 results in revising the selection of optimal technologies and revising the backup and recovery schedule. For the backup event, System 10 finds that it should use IBM_ESS_FLASHCOPY, TSM_Backup_Compress. System 10 also finds that backups can now be scheduled every 4 days and still deliver the desired QoS.

The backup and recovery execution strategy should be refined for the following cases:

Application switches to another SOP 310. This could be an upgrade (bronze to platinum) or a downgrade (gold to bronze).
SOP 310 maps to a different set of SOEs 315.
SOE 315 maps to a different set of hardware and software technologies.
System environment changes, i.e., addition of hardware, deletion of hardware, and software technologies/features.
Application workload changes, i.e., number and size of database objects, data volatility, and exception events (such as task failures and database object failures).
Potential or actual nonconformance of desired QoS or even over achievement.

Reevaluation by system 10 comprises a determination of whether the desired QoS can be delivered for the application that is registered to a particular SOP 310 in addition to potential invalidation of the events that may already be scheduled for the affected applications. Reevaluation further comprises an automatic regeneration of a revised execution strategy to meet the desired QoS.

Figure 5:
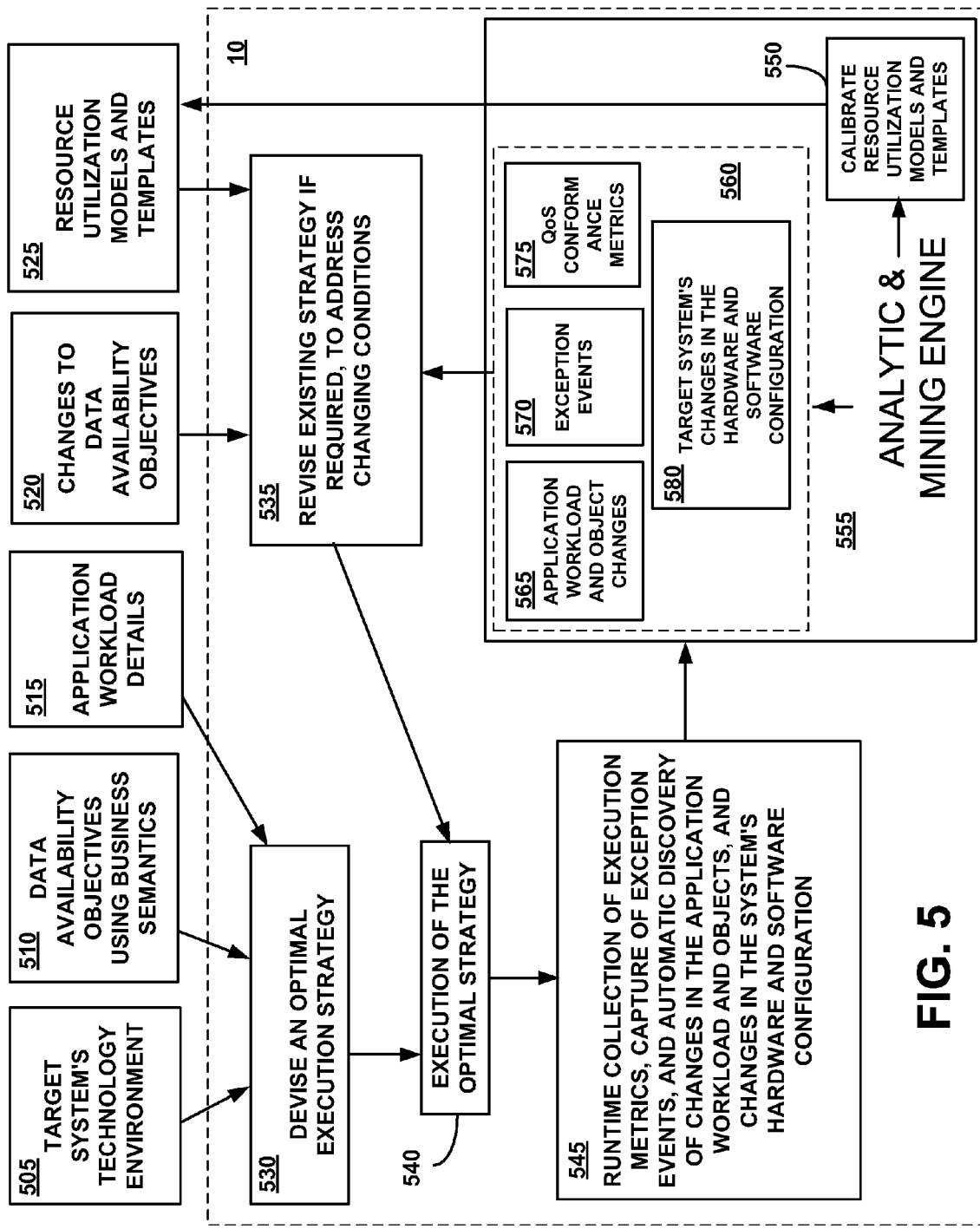
FIG. 5 represents a high-level block diagram of the resource optimizing system of the foregoing figures.

Referring now to FIG. 5, it represents an exemplary high-level block diagram of the resource optimizing system 10. In FIG. 5, references 505, 510, and 515 refer to exemplary metrics that are inputted into system 10 to devise an optimal execution strategy (block 530). As the optimal execution strategy is being executed (block 540), system 10 collects various information, including but not limited to the execution metrics, exception events, changes in the application workload and objects, and changes in the system's hardware and software confirmation (block 545).

The information collected at block 545 is fed to an analytical and mining engine 555. The analytical and mining engine 555 analyzes the application workload and object changes 565, the exception events 570, the QoS conformance metrics 575, and the target system's changes in the hardware and software configuration, and uses this information to revise the existing strategy, (block 535), if required, taking into account the changing conditions (blocks 520, 525).

Concurrently, the analytical and mining engine 555 uses the analytical information to calibrate the resource utilization models and templates, if needed (block 550). The analytical and mining engine 555 stores the calibrated resources utilization models and templates (block 525), that are fed back into system 10 (block 535) to revise the existing strategy, if required.

The revised strategy is then executed by system 10 at block 540.

It is to be understood that the specific embodiments of the invention that have been described are merely illustrative of certain application of the principle of the present invention. Numerous modifications may be made to the system and method for automatically and dynamically optimizing backup resources invention described herein without departing from the spirit and scope of the present invention. As an example, while the present system will be described herein, for illustration purpose only, in connection with backup and recovery applications, it should be abundantly clear to a person of ordinary skill in the field, that the present system can also be used with numerous other applications. The Service Offering Package (SOP) and Service Offering Element (SOE) concepts described herein can be extended beyond the application data availability to other disciplines, such as performance.

What is claimed is:

1. A method of dynamically optimizing a plurality of application data resources comprising:
   adjusting an execution strategy based on a variable system environment and a variable system workload;
   dynamically refining the execution strategy to deliver a contracted quality of service and optimize the plurality of application data resources;
   wherein if any one or more of the variable system environment or the variable system workload is determined to potentially adversely or positively impact a guaranteed quality of service, QoS, to be delivered to a system, readjusting the execution strategy to deliver the guaranteed QoS; and
   wherein if the variable system environment and the variable system workload are determined to not potentially adversely or positively impact the guaranteed QoS, leaving the execution strategy unchanged and recording the fact the execution strategy has not been changed in response to the variable system environment and workload.

2. The method of claim 1, wherein the variable system environment comprises a modified hardware.

3. The method of claim 1, wherein the variable system environment comprises a modified software.

4. The method of claim 1, wherein the application data resources comprise backup ant restore objects.

5. The method of claim 4, wherein the variable workload accounts for the number of queries, transactions, and uses in a system that generates data modifications to the backup and restore objects.

6. The method of claim 4, wherein the execution strategy comprises a backup and restore plan.

7. The method of claim 6, wherein adjusting the execution strategy comprises determining if a backup frequency needs to be adjusted, when new objects are added or existing objects are dropped.

8. The method of claim 7, wherein adjusting the execution strategy comprises determining a backup technology to be used.

9. The method of claim 8, wherein adjusting the execution strategy comprises determining a restore technology to be used.

10. The method of claim 1, wherein dynamically refining the execution strategy comprises continuously monitoring and responding to the variable system environment and workload, without client input.

11. The method of claim 10, wherein, dynamically refining the execution strategy comprises refining a coarseness of the execution strategy to improve a guaranteed quality of service, QoS, based on, actual runtime statistics.

12. The method of claim 1, wherein the application data resources comprise an eclectic mix of application data resources.

13. The method of claim 1, wherein dynamically refining the execution strategy comprises spanning the execution strategy across multiple systems.

14. The method of claim 1, wherein the plurality of application data resources are allowable at an application level.

15. A method of dynamically optimizing a plurality of application data resources comprising;
    adjusting an execution strategy based on a variable system environment and a variable system workload;
    dynamically refining the execution strategy to deliver a contracted quality of service and optimize the plurality of application data resources;
    associating a plurality of application dimensions with allowable technologies; and
    wherein the plurality of application dimensions comprise: recovery time, performance impact, data retention, and logical recovery time.

16. The method of claim 15, wherein associating the plurality of application dimensions with allowable technologies comprises introducing a plurality of service offering elements, SOEs, that are associated with each application dimension.

17. The method of claim 16, wherein for each service offering package, SOP, there exists one and only one SOE that is associated with each application dimension; and
    wherein each SOE is associated with at least one allowable technology.

18. A computer program product having a plurality of instruction codes embedded on a computer readable medium for dynamically optimizing a plurality of application data resources, comprising:
    a first set of instruction codes for adjusting an execution strategy based on a variable system environment and a variable system workload;
    a second set of instruction codes for dynamically refining the execution strategy to deliver a contracted quality of service and optimize the plurality of application data resources;
    wherein if any one or more of the variable system environment or the variable system workload is determined to potentially, adversely or positively impact a guaranteed quality of service, QoS, to be delivered to a system, the first set of instruction codes readjusts the execution strategy to deliver the guaranteed QoS; and wherein if the variable system environment and the variable system workload are determined to not potentially, adversely or positively impact the guaranteed QoS, the first set of instruction codes leaves the execution strategy unchanged, and a third set of instruction codes records the fact that the execution strategy has not been changed in response to the variable system environment and workload.

19. The computer program product of claim 18, wherein the execution strategy comprises of backup and restore plan.

20. The computer program product of claim 18, wherein the second set of instruction codes refines a coarseness of the execution strategy to improve a guaranteed quality of service, QoS based on actual runtime statistics.

21. The computer program product of claim 18, wherein the second set of instruction codes spans the execution strategy across multiple systems.

22. A computer program product having a plurality of instruction codes embedded on a medium for dynamically optimizing a plurality of application data resources, comprising:
a first set of instruction codes for adjusting an execution strategy based on a variable system environment and a variable system workload;
a second set of instruction codes for dynamically refining the execution strategy to deliver a contracted quality of service and optimize the plurality of application data resources;
a third set of instruction codes for associating a plurality of application dimensions with allowable technologies; and
wherein the plurality of application dimensions comprise: recovery time, performance impact, data retention, and logical recovery time.

23. The computer program product of claim 22, wherein the third set of instruction codes associating the plurality of application dimensions with allowable technologies comprises introducing a plurality of service offering elements, SOEs, that are associated with each application dimension.

24. The computer program product of claim 23, wherein for each service offering package, SOP, there exists one and only one SOE that is associated with each application dimension; and
wherein each SOE is associated with at least one allowable technology.

25. A system for dynamically optimizing a plurality of application data resources comprising: a processor
means for adjusting an execution strategy based on a variable system environment and a variable system workload;
means for dynamically refining the execution strategy to deliver a contracted quality of service and optimize the plurality of application data resources;
wherein if any one or more of the variable system environment or the variable system workload is determined to potentially, adversely or positively impact a guaranteed quality of service, QoS, to be delivered to a system, the adjusting means readjusts the execution strategy to deliver the guaranteed QoS; and
wherein if the variable system environment and the variable system workload are determined to not potentially, adversely or positively impact the guaranteed QoS, the adjusting means leaves the execution strategy unchanged and records the fact that the execution strategy has not been changed in response to the variable system environment and workload.

26. The system of claim 25, wherein the execution strategy comprises a backup and restore plan.

27. The system of claim 25, wherein the refining means refines a coarseness of the execution strategy to improve a guaranteed quality of service, QoS based on actual runtime statistics.

28. The system of claim 25, wherein the refining means spans the execution strategy across multiple systems.

29. A system for dynamically optimizing a plurality of application data resources, comprising: a processor
means for adjusting an execution strategy based on a variable system environment and a variably system workload;
means for dynamically refining the execution strategy to deliver a contracted quality of service and optimize the plurality of application data resources;
means for associating a plurality of application dimensions with allowable technologies; and
wherein the plurality of application dimensions comprise: recover time, performance impact, data retention, and logical recovery time.

30. The system of claim 29, wherein the associating means introduces a plurality offering elements, SOEs, that correspond to each application dimension.

31. The system of claim 30, wherein for each service offering package, SOP, there exists one and only one SOE that is associated with each application dimension; and
wherein each SOE is associated with at least one allowable technology.

* * * * *